United States Patent [19]

Lively et al.

[11] 4,213,357

[45] Jul. 22, 1980

[54] CUTTING DEVICE FOR PIPE JACKETS

[75] Inventors: Steven A. Lively, Dewey; Richard B. Gwin, Bartlesville, both of Okla.

[73] Assignee: H. C. Price Co., Bartlesville, Okla.

[21] Appl. No.: 943,103

[22] Filed: Sep. 18, 1978

[51] Int. Cl.[2] .............................. B23B 3/22; B23B 3/04
[52] U.S. Cl. ....................................... 82/4 C; 82/70.2; 82/86
[58] Field of Search ................. 82/4 C, 46, 70.1, 70.2, 82/71, 72, 73, 74, 75, 76, 77, 78, 86

[56] References Cited

U.S. PATENT DOCUMENTS

| 680,228 | 8/1901 | Couston et al. | 82/4 C |
| 1,664,807 | 4/1928 | Cole | 82/70.2 |
| 3,071,033 | 1/1963 | Felts | 82/76 |
| 3,379,080 | 4/1968 | Massa | 82/72 |
| 3,807,047 | 4/1974 | Sherer et al. | 82/72 |
| 3,848,489 | 11/1974 | Santana | 82/70.2 |

FOREIGN PATENT DOCUMENTS

| 1752861 | 7/1970 | Fed. Rep. of Germany | 82/4 C |
| 1515065 | 1/1968 | France | 82/70.1 |
| 1392637 | 4/1975 | United Kingdom | 82/70.2 |
| 193269 | 5/1967 | U.S.S.R. | 82/70.1 |

Primary Examiner—Harrison L. Hinson
Attorney, Agent, or Firm—Lowe, Kokjer, Kircher, Wharton & Bowman

[57] ABSTRACT

A device for cutting a metal or plastic jacket which surrounds a layer of foam on an insulated pipe is the subject of the present invention. A circumferential track mounts on the jacket and a ring gear is movable in the track. The cutting means is mounted on the ring gear for movement therewith. The cutting means is pivotally mounted so that it may assume a first position out of cutting engagement. Even in its non-cutting position, however, the leading edge of the cutting means will contact the jacket and movement in a circumferential direction will cause the cutting edge to penetrate the jacket and urge it into its cutting position. A motor is provided to drive the ring gear and cutting means around the track.

1 Claim, 4 Drawing Figures

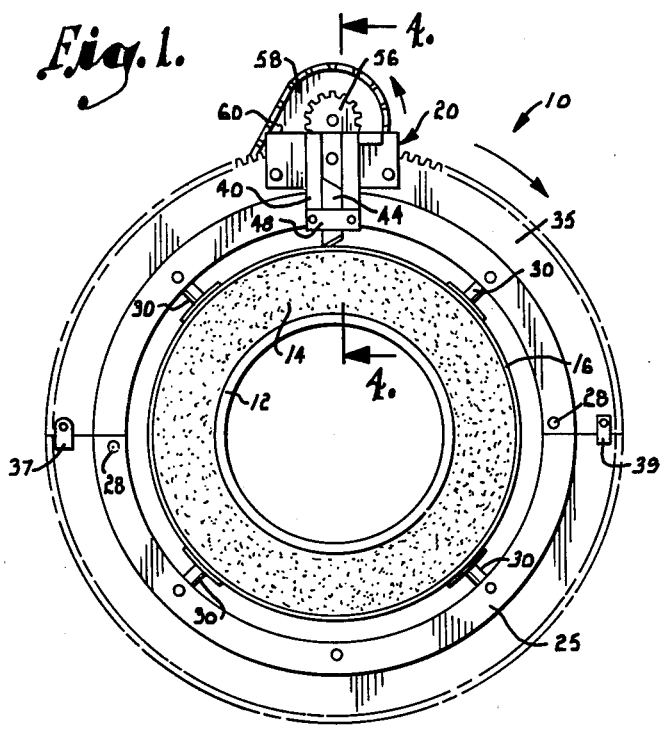
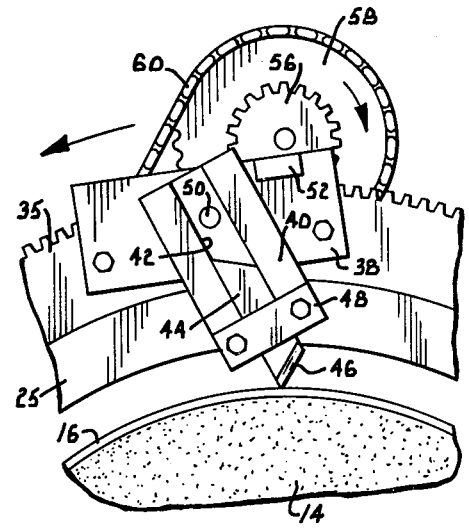
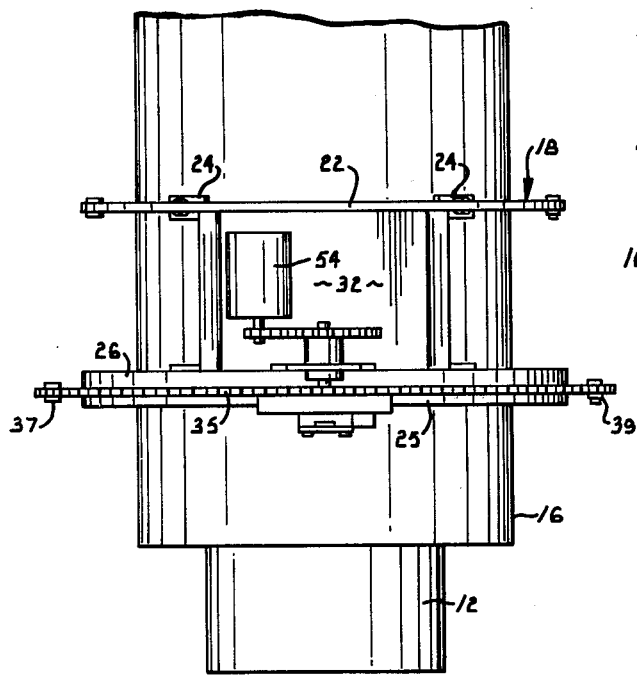

CUTTING DEVICE FOR PIPE JACKETS

This invention relates generally to circumferential pipe cutters and, more particularly, to a device for cutting a relatively thin metal or plastic jacket which surrounds a layer of foam on an insulated pipe.

With increasing amounts of petroleum being extracted from Arctic regions, the need for thermal insulated pipelines has increased substantially. The insulation is normally provided by a layer of urethane foam several inches thick which is protected from physical damage and atmospheric deterioration by a protective covering or jacket. In some procedures the jacket is also used as a form for shaping and retaining the foam when it is applied to the pipe.

When two joints of pipe are to be welded together in the field, it is necessary to "cut back" a portion of the foam insulation and the protective jacket around the foam to allow sufficient room for welding and for subsequent placement of sufficient material to make an adequate field joint. Normally, the protective jacket is cut back a distance of several inches farther than the foam layer to leave an exposed area for joining the yard-applied foam with the field-applied foam and attendant jacket.

Since removal of the protective jacket ahead of shipment could lead to damage of the foam, one of the last steps prior to making a field joint is to cut away the metal jacket to expose several inches of the underlying foam. Heretofore this has been done by power saws operated by an individual worker. The procedure is costly from the standpoint of being labor intensive, and requires considerable precautions to avoid danger to the worker. It also requires a certain level of skill on the part of the worker to avoid cutting to a depth which will damage the underlying foam insulation.

It is, therefore, an important object of the present invention to provide a device for cutting away a portion of a jacket surrounding a layer of foam insulation on a pipe which automatically circumscribes the pipe and is much faster than utilizing a manual saw.

As a corollary to the above object, an important aim of the invention is to provide a device for automatically cutting away a jacket surrounding a layer of foam insulation on a pipe wherein the device is more accurate than heretofore used manual methods, is less likely to cause damage to the underlying foam and is safer to operate than hand-held saws.

Another object of the invention is to provide a device as described in the foregoing objects wherein the cutting edge is easily adjustable to accommodate different thicknesses of material and may also be removed for sharpening or replacement when required.

Other objects of the invention will be made clear or become apparent from the following description and claims when read in light of the accompanying drawing wherein:

FIG. 1 is a side elevational view of the cutting device of the present invention;

FIG. 2 is a top plan view of the device illustrated in FIG. 1;

FIG. 3 is an enlarged fragmentary elevational view of the cutting element; and

FIG. 4 is a vertical cross-sectional view, taken along line 4—4 of FIG. 1.

Referring initially to FIG. 1, the device of the present invention is designated generally by the numeral 10 and is intended to be used primarily in conjunction with a foam insulated pipe 12. Pipe 12 is surrounded by a relatively thick layer of foam insulation 14 which is in turn surrounded by a metal jacket 16.

Device 10 comprises a framework 18 and a cutting head 20.

Framework 18 comprises a first annular support 22 which is held in spaced relationship to jacket 16 by a plurality of radially extending feet 24. Disposed in longitudinally spaced relationship to support 22 are first and second annular ring gear retainers 25 and 26. Retainer 26 is of generally inverted L-shaped configuration for purposes to be made clear hereinafter. Retainers 25 and 26 are held in rigid spaced apart relationship by a plurality of bolts 28 and associated spacers 31. A platform 32 extends between support 22 and retainer 26. A plurality of feet 30 depend from retainers 24 and 26 to support the latter in spaced relationship to jacket 16.

A ring gear 35 is disposed between retainers 24 and 26 and has an L-shaped extension 36 thereon which is complemental to retainer 26 to hold gear 35 in position.

It is to be noted that ring gear 35 is hinged at 37 and each of retainers 25 and 26 is similarly bifurcated to allow the entire assembly to be opened for placement relative to pipe 12. A mechanical lock 39 holds the assembly in its circumscribing position for operation.

Cutting head 20 comprises a block 38 rigidly mounted on ring gear 35. Pivotally mounted on block 38 is a blade support 40 having a recessed channel 42 for receiving a blade 44. Blade 44 has an exposed cutting edge 46 at one end. The blade is held within channel 42 by a retainer plate 48. The entire blade support is pivotal on block 38 about axis 50. A stop 52 is provided to limit pivotal movement in one direction.

Mounted on platform 32 is a motor 54 which drives a pinion gear 56 through a drive sprocket 58 and a drive chain 60.

In operation, the device 10 is positioned on jacket 16 by opening ring gear 35 and the associated framework 18 and then locking the assembly into its circumscribing position where gear 35 extends 360° around jacket 16. Next, the position of cutting blade 44 relative to support 40 is adjusted so that, with the support in the angular position shown in FIG. 3, the leading end of cutting edge 46 will engage jacket 16. Care is taken so that once blade 44 penetrates the jacket it will not damage the underlying foam layer 14. Thus, with the blade in its angular position, once movement of ring gear 35 commences, the blade will be forced to penetrate the jacket and commence cutting. As motor 54 is actuated and gear 56 commences to drive gear 35 relative to the framework, block support 40 will be urged from the angular position shown in FIG. 3 into the vertical position shown in FIG. 1 wherein blade 44 penetrates jacket 16. As ring gear 35 and the cutting head 20 continue to rotate, blade 44 will completely sever a portion of jacket 16. The resistance of jacket 16 to the action of blade 44 will continuously urge support 40 against stop 52 to assure a firm cutting action. When it is desired to disengage blade 44, ring gear 35 is simply moved in reverse, causing support 40 to pivot about axis 50 into the angular position shown in FIG. 3.

The cutting device of the present invention may be utilized with a jacket 16 constructed from plastic material as well as a jacket of metal. It has been found that the device meets all of the objects as heretofore set forth and, therefore, offers considerable advantages over prior art techniques.

Having thus described our invention, we claim:

1. A device for cutting away a portion of a jacket surrounding a layer of foam insulation on a pipe, said device comprising:

means disposed on said jacket to present an arcuate track;

means for traveling around said track;

pivotally mounted cutting means comprising a cutting edge and a support therefore, said cutting menas disposed on said means for traveling around said track, said cutting means being free to pivot from a first position wherein said cutting edge is disposed at an acute angle relative to a plane passing through the pivot axis and is in contact with said jacket to a second position wherein said cutting means penetrates said jacket;

stop means disposed on said means for traveling around said track and engageable by said cutting means when the latter assumes its second position; and means for moving said means for traveling around said track.